US008825327B2

(12) United States Patent
Kimura

(10) Patent No.: US 8,825,327 B2
(45) Date of Patent: Sep. 2, 2014

(54) DRIVE CONTROL DEVICE AND METHOD FOR VEHICLE

(75) Inventor: Kenji Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/350,953

(22) Filed: Jan. 16, 2012

(65) Prior Publication Data

US 2012/0191312 A1    Jul. 26, 2012

(30) Foreign Application Priority Data

Jan. 20, 2011    (JP) .................................. 2011-009802

(51) Int. Cl.
  *G06G 7/00*    (2006.01)
(52) U.S. Cl.
  USPC .................. 701/70; 701/72; 701/93; 180/271
(58) Field of Classification Search
  USPC ........................... 701/53, 70, 72, 93; 180/271
  See application file for complete search history.

(56) References Cited

U.S. PATENT DOCUMENTS

| 4,513,235 | A | * | 4/1985 | Acklam et al. ................. 318/685 |
| 5,485,892 | A | * | 1/1996 | Fujita ............................ 180/167 |
| 2003/0135317 | A1 | * | 7/2003 | Hijikata et al. ................. 701/70 |
| 2003/0172767 | A1 | * | 9/2003 | Apel et al. ....................... 74/513 |
| 2010/0204883 | A1 | | 8/2010 | Honda |
| 2010/0250084 | A1 | * | 9/2010 | Takiguchi et al. .............. 701/70 |
| 2011/0125367 | A1 | * | 5/2011 | Sakaguchi et al. ............. 701/36 |
| 2011/0214526 | A1 | * | 9/2011 | Demma et al. .................. 74/560 |
| 2012/0152053 | A1 | * | 6/2012 | Kondo et al. ................... 74/513 |

FOREIGN PATENT DOCUMENTS

| JP | 2006-168614 A | 6/2006 |
| JP | 2006-168684 A | 6/2006 |
| JP | 2007-030551 A | 2/2007 |
| JP | 2007-125933 A | 5/2007 |
| JP | 2009-041544 A | 2/2009 |
| JP | 2010-030515 A | 2/2010 |

* cited by examiner

*Primary Examiner* — Calvin Cheung
*Assistant Examiner* — Thomas Ingram
(74) *Attorney, Agent, or Firm* — Gifford, Krass, Sprinkle, Anderson & Citkowski, P.C.

(57) ABSTRACT

A drive control device for a vehicle includes an additional operation reaction force applying part that is configured to apply an additional operation reaction force to an accelerator pedal depending on the speed of depression of the accelerator pedal and the speed of the vehicle, and a lower limit changing part that is configured to change the lower limit of the speed of depression, above which the additional operation reaction force is applied, depending on the traveling direction of the vehicle. Therefore, the drive control device can apply an additional operation reaction force appropriately depending on the vehicle speed and the speed of depression of the accelerator pedal in each traveling direction.

18 Claims, 4 Drawing Sheets

FIG.5

| TRAVELING DIRECTION / PLACE WHERE VEHICLE IS BEING DRIVEN | TRAVELING STRAIGHT FORWARD | | TURNING LEFT | | TURNING RIGHT | | TRAVELING BACKWARD |
|---|---|---|---|---|---|---|---|
| IN OR AROUND PARKING LOT (ELDERLY PERSON) | Vthps' | > | Vthpl' | > | Vthpr' | > | Vthpb' |
| | ∧ | | ∧ | | ∧ | | ∧ |
| IN OR AROUND PARKING LOT | Vthps | > | Vthpl | > | Vthpr | > | Vthpb |
| | ∧ | | ∧ | | ∧ | | ∧ |
| IN OR AROUND INTERSECTION | Vthcs | > | Vthcl | > | Vthcr | > | Vthcb |
| | ∧ | | ∧ | | ∧ | | ∧ |
| ON STRAIGHT OR CURVED ROAD | Vthss | > | Vthsl | > | Vthsr | > | Vthsb |

FIG.6

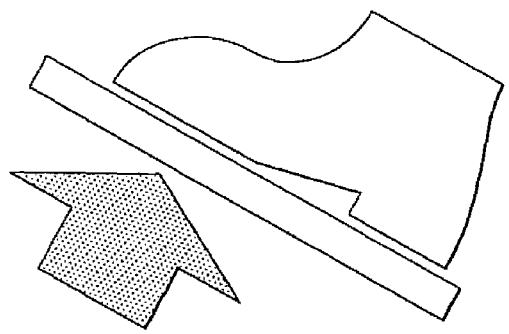

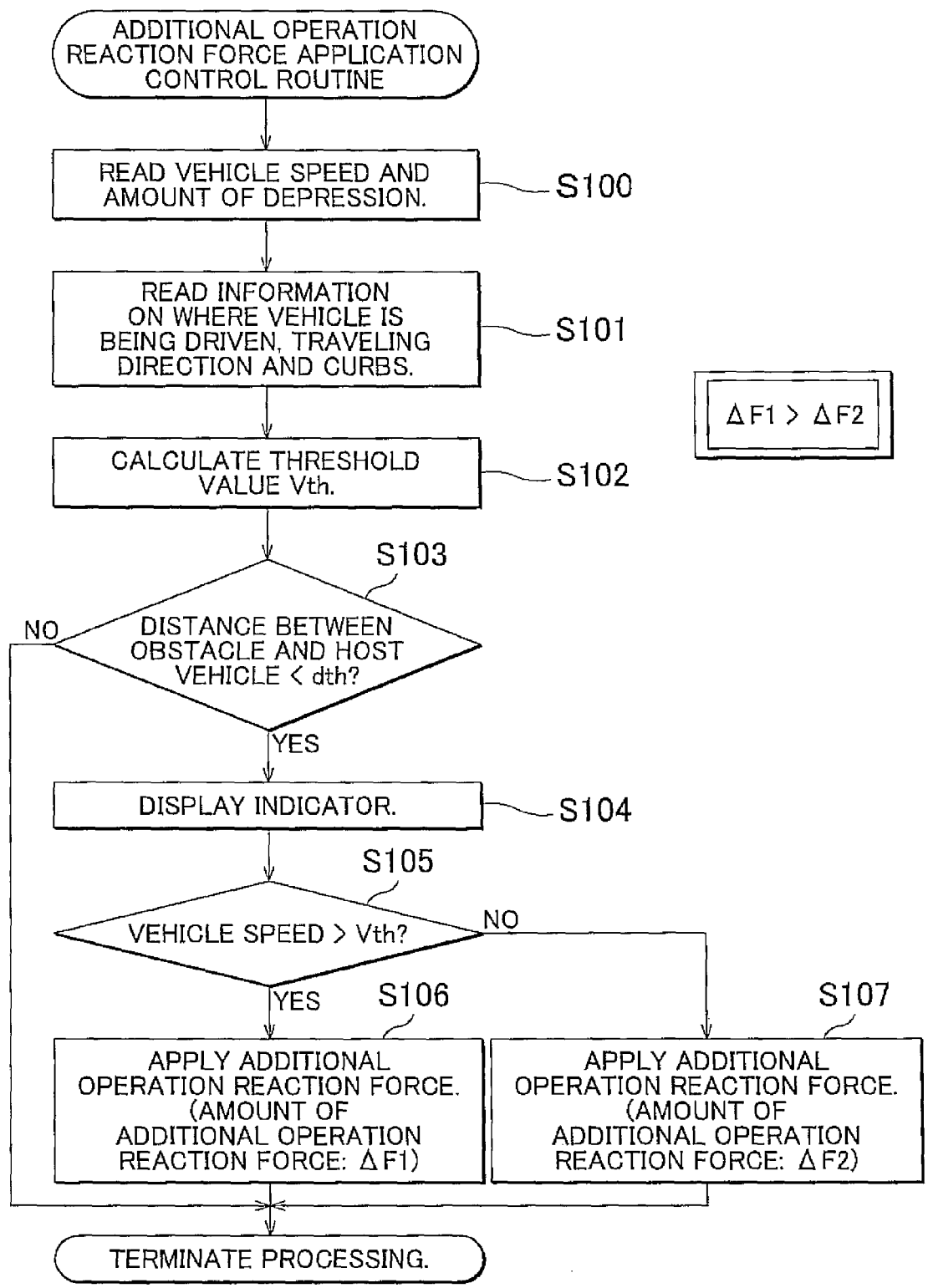

DRIVE CONTROL DEVICE AND METHOD FOR VEHICLE

CROSS-REFERENCE TO RELATED APPLICATIONS

This application claims priority to Japanese Patent Application No. 2011-009802 filed on Jan. 20, 2011, which is incorporated herein by reference in its entirety including the specification, drawings and abstract.

BACKGROUND OF THE INVENTION

1. Field of the Invention

The present invention relates to a drive control device and method for a vehicle that applies an additional operation reaction force to an accelerator pedal depending on the speed of depression of the accelerator pedal and vehicle speed.

2. Description of Related Art

Conventionally, a drive control device for a vehicle that assists the driver's maneuver by applying an additional operation reaction force to the accelerator pedal is available. For example, Japanese Patent Application Publication No. 2007-125933 (JP-A-2007-125933) discloses a drive control device for a vehicle that applies an additional operation reaction force to the accelerator pedal when the distance to a preceding vehicle is too close and warns the driver appropriately that the vehicle is approaching the preceding vehicle by applying a greater additional operation reaction force as the amount of depression of the accelerator pedal is greater.

Japanese Patent Application Publication No. 2010-030515 (JP-A-2010-030515) discloses a drive control device for a vehicle that applies an additional operation reaction force to the accelerator pedal when the vehicle is approaching an obstacle and changes the timing of the application of an additional operation reaction force depending on the type of the obstacle.

Japanese Patent Application Publication No. 2007-030551 (JP-A-2007-030551) discloses a drive control device for a vehicle that corrects the operation reaction force that is applied to the accelerator pedal depending on the degree of closeness between the host vehicle and an obstacle ahead of it and determines the method of correcting the operation reaction force based on the type of the obstacle and the driver's way of operating the accelerator pedal.

Japanese Patent Application Publication No. 2006-168684 (JP-A-2006-168684) discloses a drive control device for a vehicle that, when there is a possibility that the host vehicle deviates from its lane, imparts a yaw moment to the host vehicle in a direction to prevent the vehicle from deviating from the lane. This drive control device controls the generation of a yaw moment when the amount of depression of the accelerator pedal is so large that it is determined that the driver is intentionally moving the vehicle in a direction to deviate it from the lane even when there is a possibility that host vehicle deviates from its lane. In addition, at this time, the drive control device that is disclosed in JP-A-2006-168684 not only controls the generation of yaw moment but also increases the operation reaction force that is applied to the accelerator pedal to allow the driver to perceive how much the generation of yaw moment is controlled.

SUMMARY OF THE INVENTION

The present invention provides a drive control device and method for a vehicle that can apply an additional operation reaction force to an accelerator pedal more appropriately depending on the situation.

A first aspect of the present invention is a drive control device for a vehicle that includes an additional operation reaction force applying part that is configured to apply an additional operation reaction force to an accelerator pedal depending on the speed of depression of the accelerator pedal and the speed of the vehicle, and a lower limit changing part that is configured to change a lower limit of the speed of depression, above which the additional operation reaction force is applied, depending on the traveling direction of the vehicle.

The present inventor thought that contact with an obstacle due to overdepression of the accelerator pedal can be prevented effectively if an additional operation reaction force is applied to the accelerator pedal appropriately at the appropriate time. Thus, the present inventor studied the situations where a contact with an obstacle occurred because of depression of the accelerator pedal and as a result, it has been found that the vehicle speed at the time of occurrence of contact was different depending on the traveling direction of the host vehicle or the location of the contact.

In general, the vehicle speed and the speed of depression of the accelerator pedal during a right or left turn or during reverse travel are different from those during forward travel. Thus, if the lower limit of the speed of depression of the accelerator pedal, at which application of an additional operation reaction force to the accelerator pedal is started, is changed depending on the traveling direction of the host vehicle as in the above configuration, the additional operation reaction force can be applied at a more appropriate time. Therefore, according to the above configuration, an additional operation reaction force can be applied to the accelerator pedal more appropriately depending on the situation.

A second aspect of the present invention is a drive control device for a vehicle that includes an additional operation reaction force applying part that is configured to apply an additional operation reaction force to the accelerator pedal depending on the speed of depression of the accelerator pedal and the speed of the vehicle, an additional amount increasing part that is configured to increase the amount of additional operation reaction force when the vehicle speed exceeds a threshold value, and a threshold value changing part that is configured to change the threshold value of the vehicle speed depending on the traveling direction of the vehicle.

As described above, the vehicle speed and the speed of depression of the accelerator pedal are different depending on the traveling direction of the host vehicle. Thus, an additional operation reaction force can be applied to the accelerator pedal more appropriately when the vehicle speed at which the amount of the additional operation reaction force starts to be increased is changed depending on the traveling direction of the host vehicle as in the above configuration. Therefore, according to the above configuration, an additional operation reaction force can be applied to the accelerator pedal more appropriately depending on the situation.

A third aspect of the invention is a drive control method for a vehicle, including: applying an additional operation reaction force to an accelerator pedal depending on a speed of depression of the accelerator pedal and a speed of the vehicle; and changing a lower limit of the speed of depression, above which the additional operation reaction force is applied, depending on a traveling direction of the vehicle.

A fourth aspect of the invention is a drive control method for a vehicle, including: applying an additional operation reaction force to an accelerator pedal depending on a speed of depression of the accelerator pedal and a speed of the vehicle; when the speed of the vehicle exceeds a threshold value, increasing an amount of the additional operation reaction force; and changing the threshold value of the vehicle speed depending on a traveling direction of the vehicle.

These methods also bring about similar effects achieved by the above described drive control devices,

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a table that shows a mode of setting threshold values Vth of the vehicle speed for different traveling directions of the host vehicle and for different places where the host vehicle is being driven in the embodiment;

FIG. 6 is a diagram that illustrates an example of a mode of display of an indicator that is displayed when an additional operation reaction force is applied in the embodiment; and FIG. 7 is a flowchart that shows the processing procedure of the additional operation reaction force application control routine that is applied to the embodiment.

DETAILED DESCRIPTION OF EMBODIMENTS

Description is hereinafter made of one embodiment that embodies a drive control device for a vehicle according to the invention with reference to FIG. 1 to FIG. 7. First, the configuration of the drive control device for a vehicle according to this embodiment is described with reference to FIG. 1.

Figure 1:
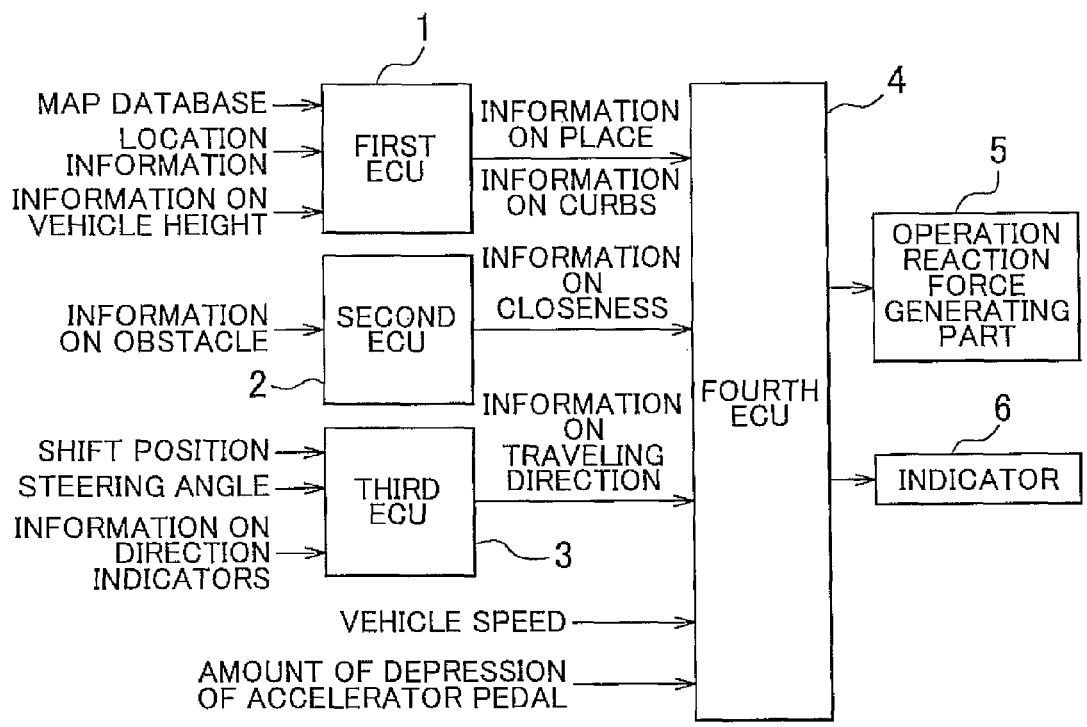
FIG. 1 is a schematic diagram that schematically illustrates a general configuration of a drive control device for a vehicle according to one embodiment of the present invention.

As shown in FIG. 1, the drive control device of this embodiment has four electronic control units, i.e., a first electronic control unit (ECU) 1, a second ECU 2, a third ECU 3, and a fourth ECU 4. Each of the ECUs 1 to 4 includes a central processing unit (CPU) that executes arithmetic processing, a read only memory (ROM) in which programs and data are stored, a random access memory (RAM) in which the result of processing in the CPU and input information are temporarily stored, an I/O that mediates information communication with the outside, and so on.

The first ECU 1 reads map database information, location information, and information on the height of the host vehicle and calculates the place where the host vehicle is being driven and the presence or absence of curbs around the host vehicle. The first ECU 1 receives information from a navigation system and a Global Positioning System (GPS) of the vehicle. The information on the place where the host vehicle is being driven and the presence or absence of curbs around the host vehicle that is calculated in the first ECU 1 is sent to the fourth ECU 4.

The second ECU 2 calculates the closeness to an obstacle. The second ECU 2 receives information from an obstacle sensor that detects the presence or absence of an obstacle around the host vehicle and the distance between the obstacle and the host vehicle. The information on the closeness to the obstacle that is calculated in the second ECU 2 is sent to the fourth ECU 4.

The third ECU 3 calculates the traveling direction of the host vehicle based on information on the shift position, the steering angle, and the operating condition of turn indicators of the host vehicle. The information on the traveling direction of the host vehicle calculated in the third ECU 3 is sent to the fourth ECU 4.

The fourth ECU 4 calculates the additional operation reaction force to be applied to the accelerator pedal and the presence or absence of indicator display based on the information that is acquired from the first to third ECUs 1 to 3. The fourth ECU 4 commands an operation reaction force generating part 5 that generates an additional operation reaction force to be applied to the accelerator pedal to apply a calculated amount of additional operation reaction force. The fourth ECU 4 also commands an indicator 6 provided on an instrument panel in the vehicle cabin to or not to make an indication.

Figure 2:
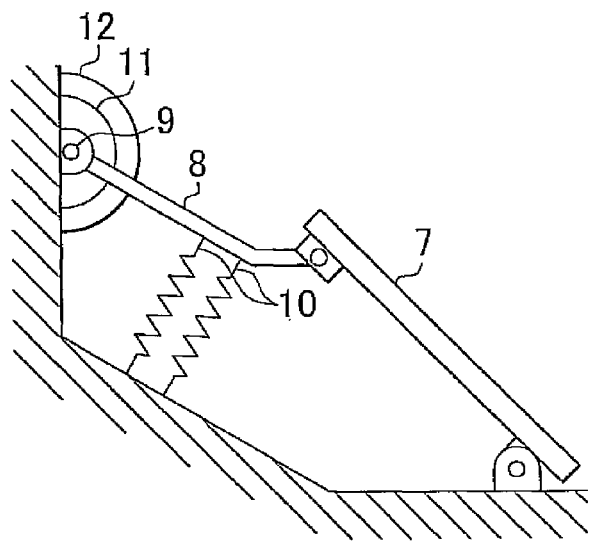
FIG. 2 is a schematic diagram that schematically illustrates a configuration of an accelerator pedal of the vehicle to which the embodiment is applied.

Referring next to FIG. 2, the configuration of the accelerator pedal of the vehicle to which this embodiment is applied is described. As shown in FIG. 2, an accelerator pedal 7 has one end that is swingably pivoted on the floor of the vehicle and the other end that is coupled to a base end of a pedal lever 8 that is bent in a generally "L" shape. The pedal lever 8 is rotatably pivoted to the accelerator pedal 7 at the base end, and fixed to a lever shaft 9 at its distal end. The lever shaft 9 is rotatably pivoted to the vehicle body such that the pedal lever 8 is swingable about the lever shaft 9. A return spring 10 urges the pedal lever 8 in a direction opposite to the direction in which the accelerator pedal 7 is depressed so that the accelerator pedal 7 can be returned to the initial position when the accelerator pedal 7 is released from depression. The return spring 10 also generates an operation reaction force (base operation reaction force Fb) that acts against depression of the accelerator pedal 7. The lever shaft 9 is provided with an accelerator position sensor 11 that is constituted of a Hall element or the like and detects the angle of rotation of the lever shaft 9, consequently, the amount of depression of the accelerator pedal 7.

In addition, in this embodiment, a drive shaft of an actuator 12, which is constituted of a servomotor or the like, as the operation reaction force generating part 5 is coupled to the lever shaft 9. The actuator 12 generates a torque that acts against the depression of the accelerator pedal 7 in response to a motion of the accelerator pedal 7 such that an additional operation reaction force, in addition to the base operation reaction force Fb, is applied to the accelerator pedal 7.

Figure 3:
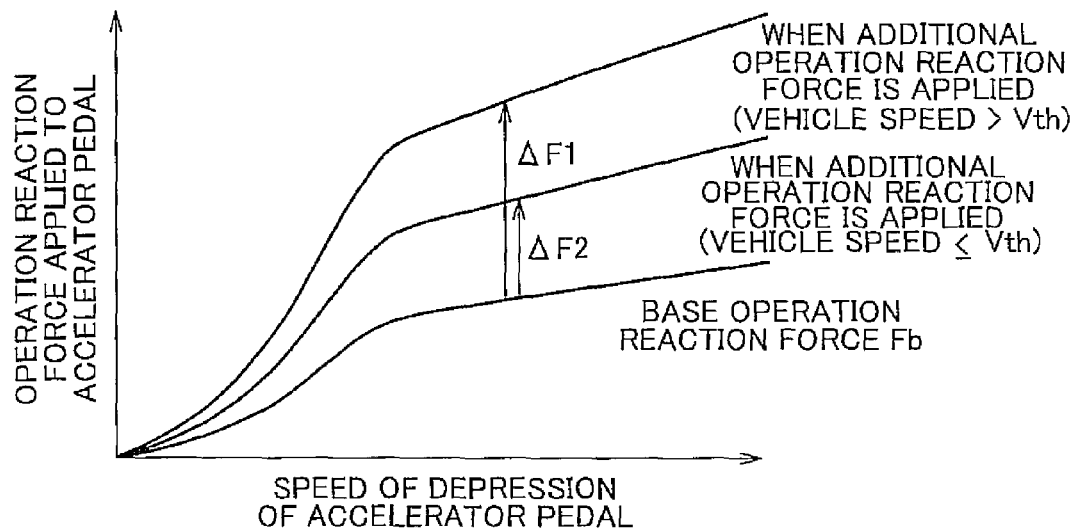
FIG. 3 is a graph that shows the relationship between the speed of depression of the accelerator pedal and the operation reaction force in the case where an additional operation reaction force is applied and in the case where an additional operation reaction force is not applied in the embodiment.

The additional operation reaction force application control in this embodiment that is constituted as described above is next described. The additional operation reaction force application control is performed by the fourth ECU 4. The fourth ECU 4 commands the actuator 12 (the operation reaction force generating part 5) to generate an additional operation reaction force that is equal to or greater than the base operation reaction force Fb for the accelerator pedal 7. FIG. 3 shows the relationship between the speed of depression of the accelerator pedal 7 and the operation reaction force in the case where an additional operation reaction force is applied together with the relationship between the speed of depression and the base operation reaction force Fb. It should be noted that in this embodiment, a greater additional operation reaction force is applied when the vehicle speed is greater than a threshold value Vth compared to when the vehicle speed is equal to or lower than the threshold value Vth. The threshold value Vth is variable depending on the traveling direction of the host vehicle or the place where the host vehicle is being driven, and its details are described later.

In this embodiment, the fourth ECU 4 changes the lower limit of the speed of depression of the accelerator pedal 7 above which an additional operation reaction force is applied, depending on the traveling direction of the host vehicle. Specifically, as shown in FIG. 4, an additional operation reaction force is applied when the speed of depression is equal to or greater than a lower limit α if the host vehicle is turning right or left or traveling backward, whereas an additional operation reaction force is applied when the speed of depression is equal to or greater than a lower limit β, which is greater than the lower limit α, if the host vehicle is traveling straight forward.

Figure 4:
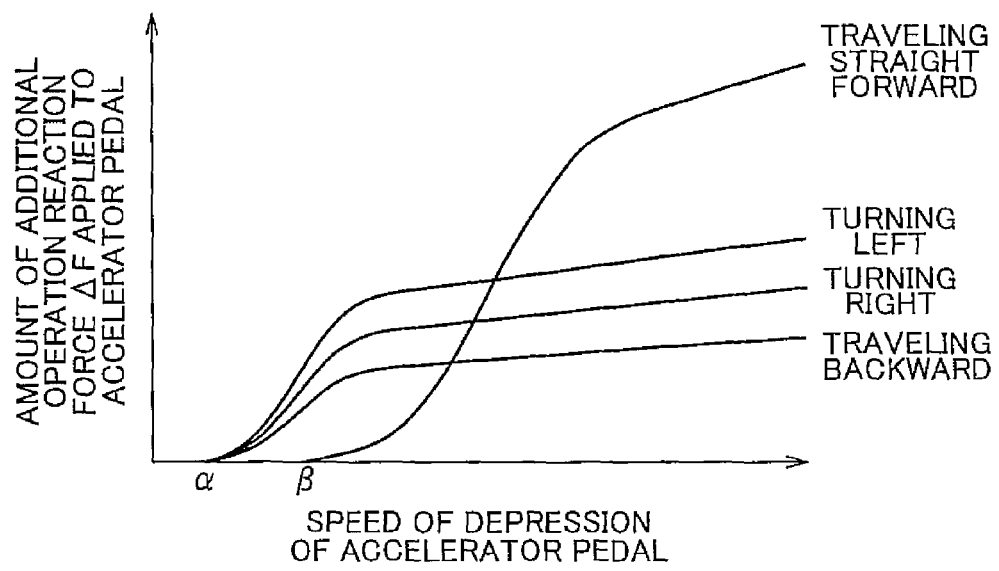
FIG. 4 is a graph that shows the relationship between the speed of depression of the accelerator pedal and the amount of additional operation reaction force for each traveling direction of the host vehicle in the embodiment.

In addition, as shown in FIG. 4, the magnitude of the additional operation reaction force (the amount of additional operation reaction force) is the lowest when the vehicle is traveling backward, second lowest when the vehicle is turning right, third lowest when the vehicle is turning left, and highest when the vehicle is traveling straight forward. It should be noted that it is in a country or region in which vehicles are required by traffic regulations to be driven on the left side of the road that the amount of additional operation reaction force is greater when the vehicle is turning left compared to when the vehicle is turning right. In a country or region in which vehicles are required by traffic regulations to be driven on the right side of the road, the amount of additional operation reaction force should be greater when the vehicle is turning right compared to when the vehicle is turning left.

In addition, in this embodiment, the fourth ECU 4 increases the additional operation reaction force to be applied to the accelerator pedal 7 when the vehicle speed is greater than a threshold value Vth as described above. In addition, the fourth ECU 4 changes the threshold value Vth depending on the traveling direction of the host vehicle and the place where the host vehicle is being driven.

Specifically, the threshold value Vth is set in a mode that is shown in the table of FIG. 5. When it comes to the traveling direction of the host vehicle, the threshold value Vth is the lowest when the host vehicle is traveling backward, second lowest when the host vehicle is turning right, third lowest when the host vehicle is turning left, and highest when the host vehicle is traveling straight forward. It should be noted that in a country or region in which vehicles are required by traffic regulations to be driven on the right side of the road, the threshold value Vth should be lowest when the host vehicle is traveling backward, second lowest when the host vehicle is turning left, third lowest when the host vehicle is turning right, and highest when the host vehicle is traveling straight forward. When it comes to the place where the host vehicle is being driven, the threshold value Vth is the lowest when the host vehicle is being driven in or around a parking lot, second lowest when the host vehicle is being driven in or around an intersection, and highest when the host vehicle is being driven on a straight or curved road.

In addition, in this embodiment, the threshold value Vth in or around a parking lot is set lower when the driver has been confirmed to be an elderly person compared to when the driver is not. One conceivable method of determining the age of the driver is to prepare a key in which personal information, such as the date of birth, is stored for each driver and acquire the personal information from the key that is used to start the engine.

When an additional operation reaction force is applied to the accelerator pedal 7 as described above, the fourth ECU 4 informs the driver of it. The fourth ECU 4 informs the driver by displaying an indicator 6 as shown in FIG. 6, for example, on the instrument panel in the vehicle cabin.

FIG. 7 shows a flowchart of an additional operation reaction force application control routine that is applied to this embodiment. The routine processing is periodically repeated by the fourth ECU 4 while the vehicle is being driven.

When this routine is started, the vehicle speed and the amount of depression of the accelerator pedal 7 are first read in step S100. In the following step S101, information on the place where the host vehicle is being driven, on the traveling direction, and on the presence or absence of curbs around the host vehicle is read. In the following step S102, a threshold value Vth is calculated based on the place where the host vehicle is being driven and the traveling direction of the host vehicle as described above.

In the following step S103, it is determined whether the distance between an obstacle that may block the way of the host vehicle and the host vehicle is smaller than a prescribed determination value dth. If the distance is equal to or greater than the determination value dth (S103: NO), the current routine processing is immediately terminated without applying an additional operation reaction force to the accelerator pedal 7.

If the distance between the obstacle and the host vehicle is smaller than the determination value dth (S103: YES), the indicator 6, which informs that an additional operation reaction force is being applied, is displayed in step S104.

After that, it is determined in step S105 whether the vehicle speed is greater than the threshold value Vth that was calculated in step S102. If the vehicle speed is greater than the threshold value Vth (S105: YES), a larger amount of additional operation reaction force ΔF1 is applied to the accelerator pedal 7 in step S106. If the vehicle speed is equal to or smaller than the threshold value Vth (S105: NO), a smaller amount of additional operation reaction force ΔF2 is applied to the accelerator pedal 7 in step S107.

According to the drive control device for a vehicle of this embodiment as described above, the following effects can be achieved. (1) In this embodiment, the lower limit of the speed of depression of the accelerator pedal 7 above which an additional operation reaction force is applied is changed depending on the traveling direction of the host vehicle. Specifically, the lower limit of the speed of depression is set lower when the host vehicle is turning right or left compared to when the host vehicle is traveling straight forward. Because the speed of depression of the accelerator pedal 7 is generally lower when a vehicle is turning right or left compared to when a vehicle is traveling straight forward, an additional operation reaction force that acts against the depression of the accelerator pedal 7 can be applied to prevent unintentional pedal depression effectively when the lower limit of the speed of depression is set as described above.

(2) In this embodiment, the amount of additional operation reaction force to be applied to the accelerator pedal 7 is increased when the vehicle speed is greater than a threshold value Vth and the threshold value Vth of the vehicle speed is changed depending on the traveling direction of the host vehicle. Specifically, the threshold value Vth of the vehicle speed is set lower when the vehicle is turning right or left compared to when the host vehicle is traveling straight forward. Thus, because an appropriate amount of additional operation reaction force can be applied when the vehicle is turning right or left where the vehicle speed is low, an additional operation reaction force that acts against the depression of the accelerator pedal 7 can be applied appropriately to prevent unintentional pedal depression effectively.

(3) In this embodiment, the threshold value Vth of the vehicle speed is changed depending on the place where the host vehicle is being driven. Specifically, the threshold value Vth of the vehicle speed is set lower when the host vehicle is being driven in or around a parking lot compared to when the host vehicle is being driven on a road. In addition, the threshold value Vth of the vehicle speed is set lower when the host vehicle is being driven in or around an intersection compared to when the host vehicle is being driven on a straight or curved road. Thus, an appropriate amount of additional operation reaction force can be applied depending on the vehicle speed in various places where the vehicle is being driven.

(4) In this embodiment, the threshold value Vth of the vehicle speed is changed depending on the age of the driver. Specifically, the threshold value Vth of the vehicle speed is set lower when the driver has been confirmed to be an elderly person. Thus, when an elderly person with reduced driving ability is at the wheel, an additional operation reaction force starts to be applied to the accelerator pedal 7 at a lower vehicle speed. Thus, according to this embodiment, an additional operation reaction force can be applied to the accelerator pedal 7 appropriately according to the change in the driver's driving ability due to age.

The above embodiment may be modified as described below. While the threshold value Vth of the vehicle speed is set lower when the driver has been confirmed to be an elderly person or when the vehicle is being driven in or around a parking lot in the above embodiment, the threshold value Vth may be similarly set lower when the vehicle is being driven in other places.

The ages at which the threshold value Vth is changed may be defined more particularly. For example, the threshold value Vth of the vehicle speed may be also set lower when the driver has been confirmed to be a young person who got a driving license not long ago.

While the threshold value Vth of the vehicle speed is changed depending on the age of the driver in the above embodiment, the lower limit of the speed of depression of the accelerator pedal 7 above which an additional operation reaction force is applied may be changed depending on the age of the driver. In this case, one conceivable mode of setting the lower limit is to set the lower limit lower when the driver has been confirmed to be in an age group such as the elderly.

While the threshold value Vth is changed in three places, that is, in or around a parking lot, in or around an intersection, and on a straight or curbed road, in the above embodiment, the places where the threshold value Vth is changed may be defined more precisely. For example, the threshold value Vth may be changed depending on whether or not there are curbs in a parking lot, or the threshold value Vth may be changed depending on whether the vehicle is running on a straight road or a curved road.

While the threshold value Vth of the vehicle speed above which an additional operation reaction force is applied is changed depending on where the host vehicle is being driven in the above embodiment, the lower limit of the speed of depression of the accelerator pedal 7 above which an additional operation reaction force is applied may be changed depending on where the host vehicle is being driven. In this case, because the timing of application of an additional operation reaction force is changed depending on where the host vehicle is being driven, an appropriate additional operation reaction force can be applied depending on the vehicle speed and the speed of depression of the accelerator pedal in each place where the host vehicle is being driven. Specifically, the lower limit of the speed of depression may be set lower when the host vehicle is being driven in or around a parking lot compared to when the host vehicle is being driven on a road, or the lower limit of the speed of depression may be set lower when the vehicle is being driven in or around an intersection compared to when the vehicle is being driven on a straight or curved road.

While an additional operation reaction force is applied only when the distance between an obstacle and the host vehicle is smaller than a determination value dth in the above embodiment, an additional operation reaction force may be applied regardless of the distance between an obstacle and the host vehicle or without regard for the distance.

The lower limit of the speed of depression, above which an additional operation reaction force is applied, may be changed depending on the distance between an obstacle that may block the way of the host vehicle and the host vehicle. In this case, one conceivable mode of setting the lower limit is to set the lower limit of the speed of depression lower when the distance between the obstacle and the host vehicle is smaller than a preset value compared to when it is not, or to set the lower limit of the speed of depression lower as the distance is smaller.

The threshold value Vth of the vehicle speed may be changed depending on the distance between an obstacle that may block the way of the host vehicle and the host vehicle. In this case, one conceivable mode of setting the threshold value Vth is to set the threshold value Vth of the vehicle speed lower when the distance between the obstacle and the host vehicle is smaller than a preset value compared to when it is not, or to set the threshold value Vth lower as the distance is smaller.

While an additional operation reaction force is applied to the accelerator pedal 7 by the actuator 12 that is coupled to the lever shaft 9 in the above embodiment, other means may be used to apply an additional operation reaction force. For example, an additional operation reaction force may be applied to the accelerator pedal 7 by a throttle motor of an electronically-controlled throttle that is operably coupled to the lever shaft 9 via a wire.

While four electronic control units are used to perform processing related to the application of an additional operation reaction force in the above embodiment, a fewer or larger number of electronic control units may be used to perform the processing. In addition, the functions that are assigned to the electronic control units may be changed as needed.

In general, the speed of depression of the accelerator pedal is lower when a vehicle is turning right or left compared to when the vehicle is traveling straight forward. Thus, the lower limit of the speed of depression of the accelerator pedal, above which an additional operation reaction force is applied to the accelerator pedal, may be set lower when the host vehicle is turning right or left compared to when the host vehicle is traveling straight forward. With this configuration, an additional operation reaction force that acts against the depression of the accelerator pedal can be applied appropriately.

The lower limit of the speed of depression may be changed depending on, in addition to the traveling direction, the distance between an obstacle that may block the way of the host vehicle and the host vehicle. This configuration is effective in preventing contact with an obstacle due to depression of a wrong pedal. A specific conceivable example is to set the lower limit of the speed of depression lower when the distance between the obstacle and the host vehicle is smaller than a preset value compared to when the distance is not smaller than the preset value.

In addition, the vehicle speed and the speed of depression of the accelerator pedal are different depending on where the host vehicle is being driven. Therefore, when the lower limit of the speed of depression is changed depending on, in addition to the traveling direction, where the host vehicle is being driven, an additional operation reaction force can be applied to the accelerator pedal more appropriately depending on where the host vehicle is being driven. For example, the vehicle speed and the speed of depression of the accelerator pedal are generally lower in a parking lot compared to during driving on a road. Thus, the lower limit of the speed of depression may be set lower when the host vehicle is being driven in or around a parking lot compared to when the host vehicle is being driven on a road. In addition, the vehicle speed and the speed of depression of the accelerator pedals are generally lower in or around an intersection compared to during driving on a straight or curved road. Thus, the lower limit of the speed of depression may be set lower when the host vehicle is being driven in or around an intersection compared to when the host vehicle is being driven on a straight or curved road.

In addition, the ability to drive a vehicle changes depending on the age of the driver. Thus, when the lower limit of the speed of depression is changed depending on, in addition to the traveling direction, the age of the driver, an additional operation reaction force can be applied to the accelerator pedal appropriately according to the change in the driver's driving ability due to age.

In addition, the vehicle speed is generally lower when the vehicle is turning right or left compared to when the vehicle is traveling straight forward. Thus, when the threshold value of the vehicle speed is set lower when the host vehicle is turning right or left compared to when the host vehicle is traveling straight forward, an additional operation reaction force can be applied to the accelerator pedal appropriately.

In addition, it is effective in preventing a contact with an obstacle due to depression of a wrong pedal to change the threshold value of the vehicle speed depending on, in addition to the traveling direction, the distance between an obstacle that may block the way of the host vehicle and the host vehicle. One specific conceivable example is to set the threshold value of the vehicle speed lower when the distance between the obstacle and the host vehicle is smaller than a preset value compared to when the distance is not smaller than the preset value.

In addition, the vehicle speed and the speed of depression of the accelerator pedal are different depending on where the host vehicle is being driven. Therefore, when the threshold value of the vehicle speed is changed depending on, in addition to the traveling direction, where the host vehicle is being driven, an additional operation reaction force can be applied to the accelerator pedal more appropriately depending on where the host vehicle is being driven. For example, the vehicle speed and the speed of depression of the accelerator pedal are generally lower in a parking lot compared to during driving on a road. Thus, the threshold value of the vehicle speed may be set lower when the host vehicle is being driven in or around a parking lot compared to when the host vehicle is being driven on a road. In addition, the vehicle speed and the speed of depression of the accelerator pedals are generally lower in or around an intersection compared to during driving on a straight or curved road. Thus, the threshold value of the vehicle speed may be set lower when the host vehicle is being driven in or around an intersection compared to when the host vehicle is being driven on a straight or curved road.

In addition, when the threshold value of the vehicle speed is changed depending on, in addition to the traveling direction, the age of the driver, an additional operation reaction force can be applied to the accelerator pedal appropriately according to the change in the driver's driving ability due to age.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A drive control device for a vehicle, comprising:
   an additional operation reaction force applying part that is configured to only apply an additional operation reaction force to an accelerator pedal when a speed of depression of the accelerator pedal exceeds a lower limit of a speed of pedal depression; and
   a lower limit changing part that is configured to change the lower limit of the speed of pedal depression, above which the additional operation reaction force is applied, depending on a traveling direction of the vehicle.

2. The drive control device according to claim 1, wherein the lower limit changing part is configured to set the lower limit of the speed of pedal depression lower when the vehicle is turning right or left compared to when the vehicle is traveling straight forward.

3. The drive control device according to claim 1, wherein the lower limit changing part is configured to change the lower limit of the speed of pedal depression depending on, in addition to the traveling direction, a distance between an obstacle that may block a vehicle's way and the vehicle.

4. The drive control device according to claim 3, wherein the lower limit changing part is configured to set the lower limit of the speed of pedal depression lower when the distance between the obstacle and the vehicle is smaller than a preset value compared to when the distance is not smaller than the preset value.

5. The drive control device according to claim 1, wherein the lower limit changing part is configured to change the lower limit of the speed of pedal depression depending on, in addition to the traveling direction, where the vehicle is being driven.

6. The drive control device according to claim 5, wherein the lower limit changing part is configured to set the lower limit of the speed of pedal depression lower when the vehicle is being driven in or around a parking lot compared to when the vehicle is being driven on a road.

7. The drive control device according to claim 5, wherein the lower limit changing part is configured to set the lower limit of the speed of pedal depression lower when the vehicle is driven in or around an intersection compared to when the vehicle is driven on a straight or curved road.

8. The drive control device according to claim 1, wherein the lower limit changing part is configured to change the lower limit of the speed of pedal depression depending on, in addition to the traveling direction, an age of a driver.

9. A drive control device for a vehicle, comprising:
   an additional operation reaction force applying part that is configured to apply an additional operation reaction force to an accelerator pedal only when a speed of depression of the accelerator pedal exceeds a lower limit of a speed of pedal depression;

an additional amount increasing part that is configured to increase an amount of the additional operation reaction force when a vehicle speed exceeds a threshold value; and a threshold value changing part that is configured to change the threshold value of the vehicle speed depending on a traveling direction of the vehicle.

10. The drive control device according to claim 9, wherein the threshold value changing part is configured to set the threshold value of the vehicle speed lower when the vehicle is turning right or left compared to when the vehicle is traveling straight forward.

11. The drive control device according to claim 9, wherein the threshold value changing part is configured to change the threshold value of the vehicle speed depending on, in addition to the traveling direction, a distance between an obstacle that may block a vehicle's way and the vehicle.

12. The drive control device according to claim 11, wherein the threshold value changing part is configured to set the threshold value of the vehicle speed lower when the distance between the obstacle and the vehicle is smaller than a preset value compared to when the distance is not smaller than the preset value.

13. The drive control device according to claim 9, wherein the threshold value changing part is configured to change the threshold value of the vehicle speed depending on, in addition to the traveling direction, where the vehicle is being driven.

14. The drive control device according to claim 13, wherein the threshold value changing part is configured to set the threshold value of the vehicle speed lower when the vehicle is being driven in or around a parking lot compared to when the vehicle is being driven on a road.

15. The drive control device according to claim 13, wherein the threshold value changing part is configured to set the threshold value of the vehicle speed lower when the vehicle is being driven in or around an intersection compared to when the vehicle is being driven on a straight or curved road.

16. The drive control device according to claim 9, wherein the threshold value changing part is configured to change the threshold value of the vehicle speed depending on, in addition to the traveling direction, an age of a driver.

17. A drive control method for a vehicle, comprising:

applying, by an actuator, an additional operation reaction force to an accelerator pedal only when a speed of depression of the accelerator pedal exceeds a lower limit of a speed of pedal depression; and changing, by an electronic control unit, the lower limit of the speed of depression, above which the additional operation reaction force is applied, depending on a traveling direction of the vehicle.

18. A drive control method for a vehicle, comprising:

applying, by an actuator, an additional operation reaction force to an accelerator pedal only when a speed of depression of the accelerator pedal exceeds a lower limit of a speed of pedal depression;

when a vehicle speed exceeds a threshold value, increasing an amount of the additional operation reaction force applied by the actuator; and changing, by an electronic control unit, the threshold value of the vehicle speed depending on a traveling direction of the vehicle.

* * * * *